G. G. MORIN.
REAR END AUTOMOBILE SIGNAL.
APPLICATION FILED NOV. 27, 1918.
1,389,373.
Patented Aug. 30, 1921.
2 SHEETS—SHEET 1.
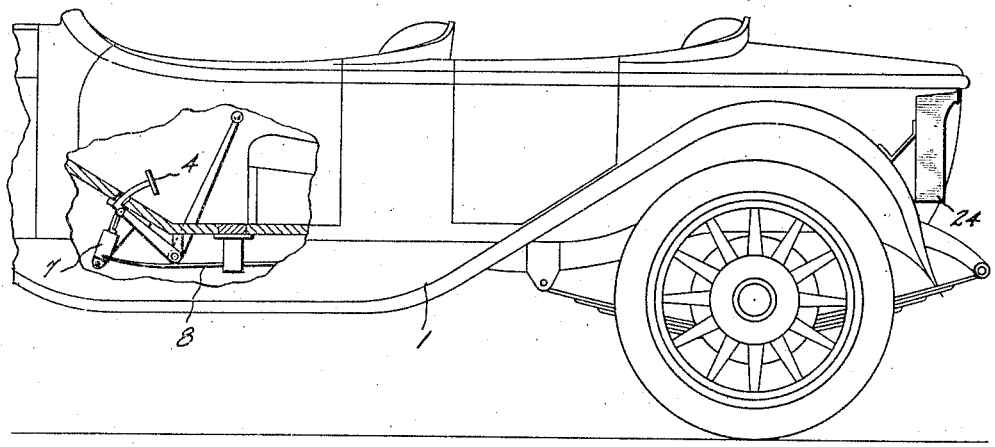
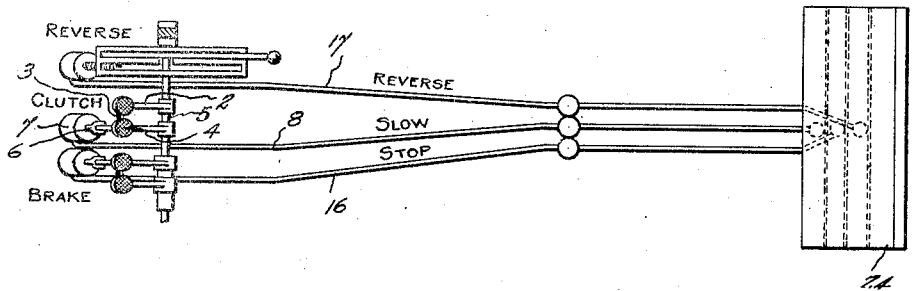
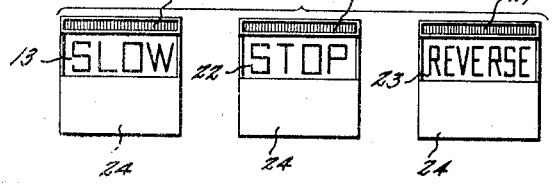
WITNESSES
INVENTOR
George G. Morin,
BY
ATTORNEYS

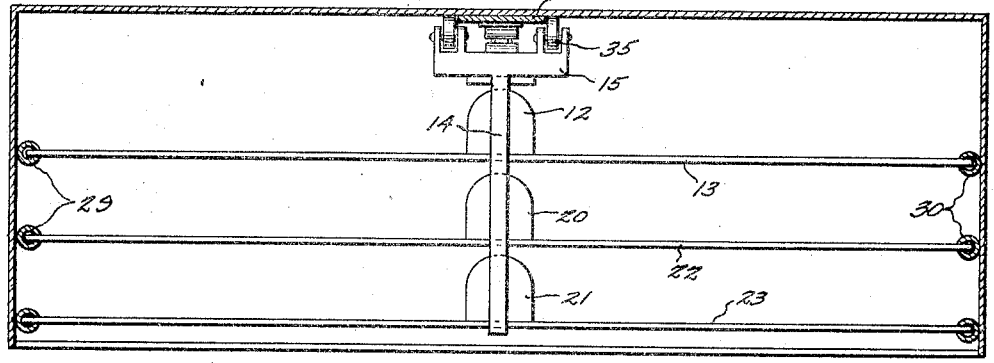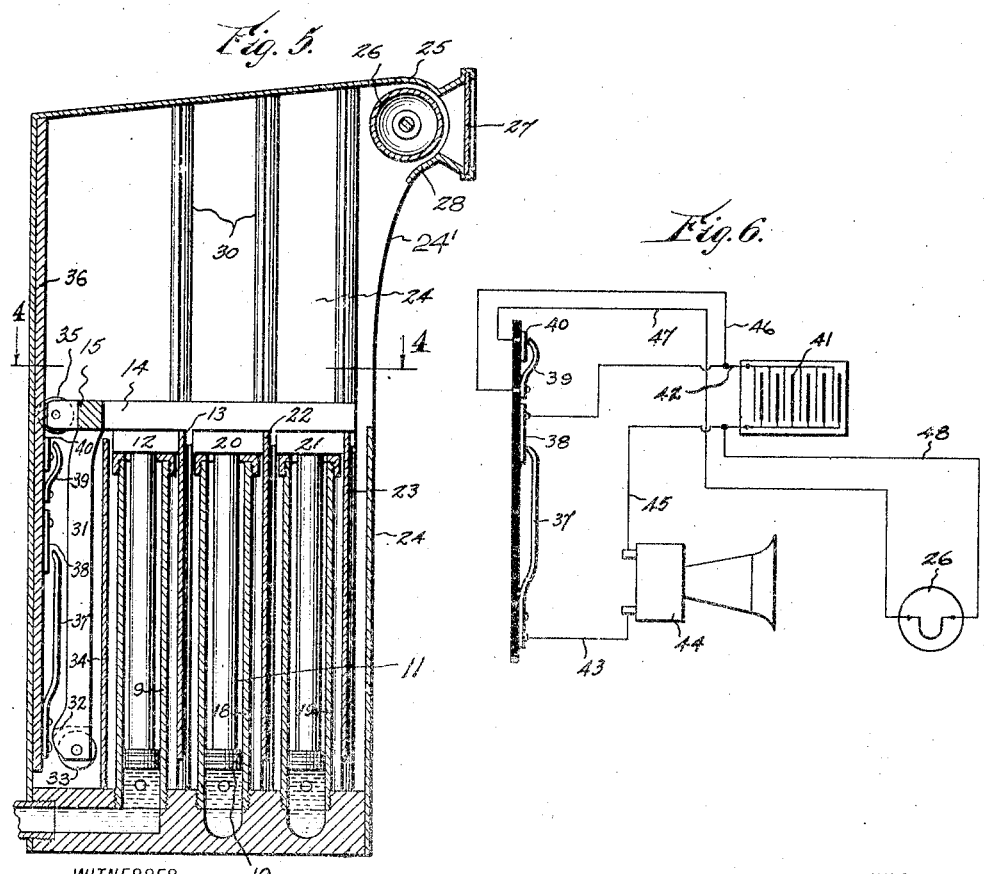

UNITED STATES PATENT OFFICE.

GEORGE G. MORIN, OF HOLYOKE, MASSACHUSETTS.

REAR-END AUTOMOBILE-SIGNAL.

1,389,373.  Specification of Letters Patent.  Patented Aug. 30, 1921.

Application filed November 27, 1918. Serial No. 264,331.

*To all whom it may concern:*

Be it known that I, GEORGE G. MORIN, a citizen of the United States, and a resident of Holyoke, in the county of Hampden and State of Massachusetts, have invented a new and Improved Rear-End Automobile-Signal, of which the following is a full, clear, and exact description.

This invention relates to signals for automobiles and has for an object the provision of an improved construction which will automatically operate when the controlling members of the automobile are operated for producing proper signals at the rear of the automobile according to the particular levers operated.

Another object of the invention is to provide a signal at the rear of an automobile which will present a sign having a legend thereon, a light and a sound.

In the accompanying drawings:

Figure 1 is a side view of part of an automobile with an embodiment of the invention applied thereto.

Fig. 2 is a top plan view of the structure disclosing the invention together with certain operative parts of the automobile shown in Fig. 1.

Fig. 3 is a view showing the three display plates in connection with the signal frame.

Fig. 4 is a sectional view through Fig. 5 on line 4—4.

Fig. 5 is a longitudinal vertical section through the rear signal box and associate parts disclosing certain features of the invention.

Fig. 6 is a diagram showing the electrical circuit, lamp and sounding member embodying certain features of the invention.

Referring to the accompanying drawings by numerals 1 indicates an automobile of any desired kind which is provided with a slow pedal 2 which rests upon an extension 3 of pedal 4. Pedal 4 is loosely mounted on the shaft 5 and is connected with a piston rod 6 which in turn is connected with a piston in the cylinder 7, said cylinder containing water or other liquid which is in free communication with the pipe 8. When pedal 4 is pushed downwardly the piston will force the water or other liquid out of the cylinder 7 into the pipe 8 and into the chamber 9 at the rear of the automobile, whereupon the piston 10 and the piston rod 11 will be raised. Piston rod 11 is connected with a bar 12 which in turn is rigidly connected with plate 13 provided with a sign having the word "Slow" thereon, as shown in Fig. 3. The bar 12 loosely engages the rod or arm 14 extending from a frame 15 so that when the piston 11 and associate parts are raised arm 14 will also be raised so that the word "Slow" will be seen and in addition a sound will be produced as hereinafter fully described. The arrangement and operation of cylinder 7 and associate parts have been briefly described as a detail description thereof is found in my co-pending application, Serial Number 144,161.

The brake and reverse levers are connected to pipes 16 and 17 in the same way that pipe 8 is associated with levers 2 and 4 so that when either the brake or reverse levers are operated water or other fluid will flow through pipes 16 and 17 to the respective chambers 18 and 19. Piston rods are arranged in these chambers similar to the piston and piston rods 10 and 11, said last mentioned pistons however being connected with bars 20 and 21 which in turn are rigidly connected with plates 22 and 23. Plates 22 and 23 carry the words "Stop" and "Reverse," respectively, whereby when the clutch is disengaged the "Slow" sign will be raised and when the brake is applied the word "Stop" will be raised. When the reverse lever is operated the word "Reverse" will appear as the plate 13 will be elevated. These chambers 9, 18 and 19 are positioned in a suitable casing 24 which casing is open at 24′ above the arm 14 so that when any of the plates are raised as just described they may be readily seen from the rear. The casing 24 is provided with an overhanging section 25 carrying an electric lamp 26 which is provided with a red glass window 27 at the rear and a solid opaque guard 28 vertically below the front part of the lamp so that the lamp can only be seen through the window 27 while at the same time it shines into the space back of opening 24′ for illuminating any of the plates 12, 22 and 23. These plates are guided in their up and down movement by suitable guides 29 and 30 as shown in Fig. 4 so that they will freely move upwardly and downwardly as desired.

The arm 14 is formed integral with or rigidly secured to frame 15, which frame is provided with a depending arm 31 having a raised portion or hump 32 near the lower end. An anti-friction wheel 33 is also provided at the lower end adapted to engage the wall 34 for preventing a rear swinging movement of arm 31 while the upper part of frame 15 is provided with anti-friction rollers 35 straddling the plate 36 whereby the frame is guided in its up and down movement. It will be noted from Fig. 5 that the cam or raised portion 32 is positioned to engage the spring 37 and depress the same so that it will contact with the plate 38 and remain in contact as long as the cam 32 is engaging spring 37. As this spring is comparatively long the engagement will be for an appreciable time. As the cam 32 continues to move upwardly it will engage a second spring 39 and force the same against the contact plate 40. As spring 39 is comparatively short the engagement of plate 40 will be brief, but for the fact that the forward movement of the cam 32 stops when spring 39 has been properly depressed whereupon the circuit hereinafter fully described will be continuously closed as long as the frame 15 and associate parts are held in an elevated position.

As shown in the diagram in Fig. 6 when the cam 32 depresses spring 37 current will flow from battery 41 through wire 42 to plate 38, spring 37, wire 43, horn 44 and wire 45 back to the battery 41. If desired instead of using a horn 44 a bell could be substituted. When the cam 32 is depressing spring 39 current will flow through wire 42, wire 46 to spring 39, plate 40, wire 47, lamp 26 and wire 48 back to the battery 41. In this way a signal will be sounded as the frame 15 is moved upwardly and then the light will be provided which will be seen as a red light through the window 27 and which will illuminate the particular sign raised. If desired only enough liquid could be forced into the various chambers 9, 18 and 19 to raise the plate slightly whereupon a signal will be sounded and shut off when the pedal is again raised for allowing the return of the parts to their former position. Either the ordinary springs connected with the clutch and brake are used for returning the piston 6 and other similar pistons to their former position, or special springs may be used for producing said return action without departing from the spirit of the invention. The weight of the piston 11 and associate parts will also assist in returning the liquid to its former position.

By this construction and arrangement it will be seen that the usual operating parts of the automobile are connected with the signal plates and rear signal means, the particular construction and operation of the transmission of power will not be claimed in this application as it is claimed in my co-pending aplication, Serial Number 144,161 heretofore referred to. However, when any of the usual controlling levers of the automobile are operated a signal will be raised, a sound will be produced and also a light will be produced. The operation of bringing to view the signal plates, producing the light and sound will not entail any extra effort on the part of the operator as these parts will be automatically operated during the operation and control of the automobile.

What I claim is:

1. In a signaling device for automobiles, the combination with a casing, of a vertically movable signal in the casing, a frame in the casing, a horizontal arm on the frame, projecting over the signal, whereby the frame is compelled to move vertically when the signal is moved vertically, a depending arm on the frame, a wall in said casing guiding the vertical movement of the arm, and a plurality of switches in said casing located in the path of movement of the arm and successively operated by said arm.

2. In a signaling device for automobiles, the combination with a casing, of a vertically movable signal in the casing, a frame in the casing, a horizontal arm on the frame projecting over the signal, whereby the frame is compelled to move vertically when the signal is moved vertically, a depending arm on the frame, a wall in said casing guiding the vertical movement of the arm, a plurality of switches in said casing located in the path of movement of the arm and successively operated by said arm, and rollers on the ends of both of said arms movable against the walls of the casing.

GEORGE G. MORIN.